United States Patent
Simoni et al.

(10) Patent No.: US 11,415,873 B2
(45) Date of Patent: Aug. 16, 2022

(54) PUBLIC TRANSPORT VEHICLE, INCLUDING A DEVICE FOR DISPLAYING ON A WINDOW

(71) Applicant: ALSTOM Transport Technologies, Saint-Ouen-sur-Seine (FR)

(72) Inventors: Bastian Simoni, Nogent sur Marne (FR); Alexandre Dubois, Paris (FR); Michel Desjardins, Marseilles (FR)

(73) Assignee: ALSTOM Transport Technologies, Saint-Ouen-sur-Seine (FR)

( * ) Notice: Subject to any disclaimer, the term of this patent is extended or adjusted under 35 U.S.C. 154(b) by 0 days.

(21) Appl. No.: 17/222,628

(22) Filed: Apr. 5, 2021

(65) Prior Publication Data
US 2021/0311380 A1 Oct. 7, 2021

(30) Foreign Application Priority Data
Apr. 7, 2020 (FR) .................................. 20 03458

(51) Int. Cl.
*G03B 21/28* (2006.01)
*B61D 25/00* (2006.01)
*G03B 21/60* (2014.01)
*B61D 37/00* (2006.01)

(52) U.S. Cl.
CPC ............. *G03B 21/28* (2013.01); *B61D 25/00* (2013.01); *B61D 37/00* (2013.01); *G03B 21/60* (2013.01)

(58) Field of Classification Search
None
See application file for complete search history.

(56) References Cited

U.S. PATENT DOCUMENTS

| 3,899,248 A * | 8/1975 | Tiger ...................... B26D 7/26 399/144 |
| 4,639,106 A | 1/1987 | Gradin |
| 2002/0044263 A1 | 4/2002 | Takeuchi |
| 2002/0105623 A1* | 8/2002 | Pinhanez ............. H04N 9/3194 353/69 |
| 2009/0113775 A1 | 5/2009 | Netter |
| 2018/0079362 A1* | 3/2018 | Miyasaka ........... B60R 13/0243 |
| 2018/0095355 A1 | 4/2018 | Lim et al. |

FOREIGN PATENT DOCUMENTS

| CN | 201170943 Y | 12/2008 |
| CN | 202563239 U * | 11/2012 |
| EP | 2977291 A1 * | 1/2016 .......... B61L 15/0045 |
| GB | 2489642 A | 10/2012 |
| JP | 2006-53323 A | 2/2006 |
| JP | 2016-49885 A | 4/2016 |
| WO | 2013/174632 A1 | 11/2013 |
| WO | 2018/033402 A1 | 2/2018 |

OTHER PUBLICATIONS

French Search Report for French Patent Application No. FR20 03458, dated Nov. 16, 2020 in 2 pages.

* cited by examiner

*Primary Examiner* — Michelle M Iacoletti
*Assistant Examiner* — Danell L Owens
(74) *Attorney, Agent, or Firm* — Knobbe, Martens, Olson & Bear, LLP

(57) ABSTRACT

A vehicle includes at least one side bay equipped with a window, and a device for displaying at least one item of information on the window. The display device includes an image projector fastened to a ceiling of the vehicle. The display device emits light rays. A system of at least one mirror is arranged to reflect light rays emitted by the image projector in the direction of the window.

8 Claims, 1 Drawing Sheet

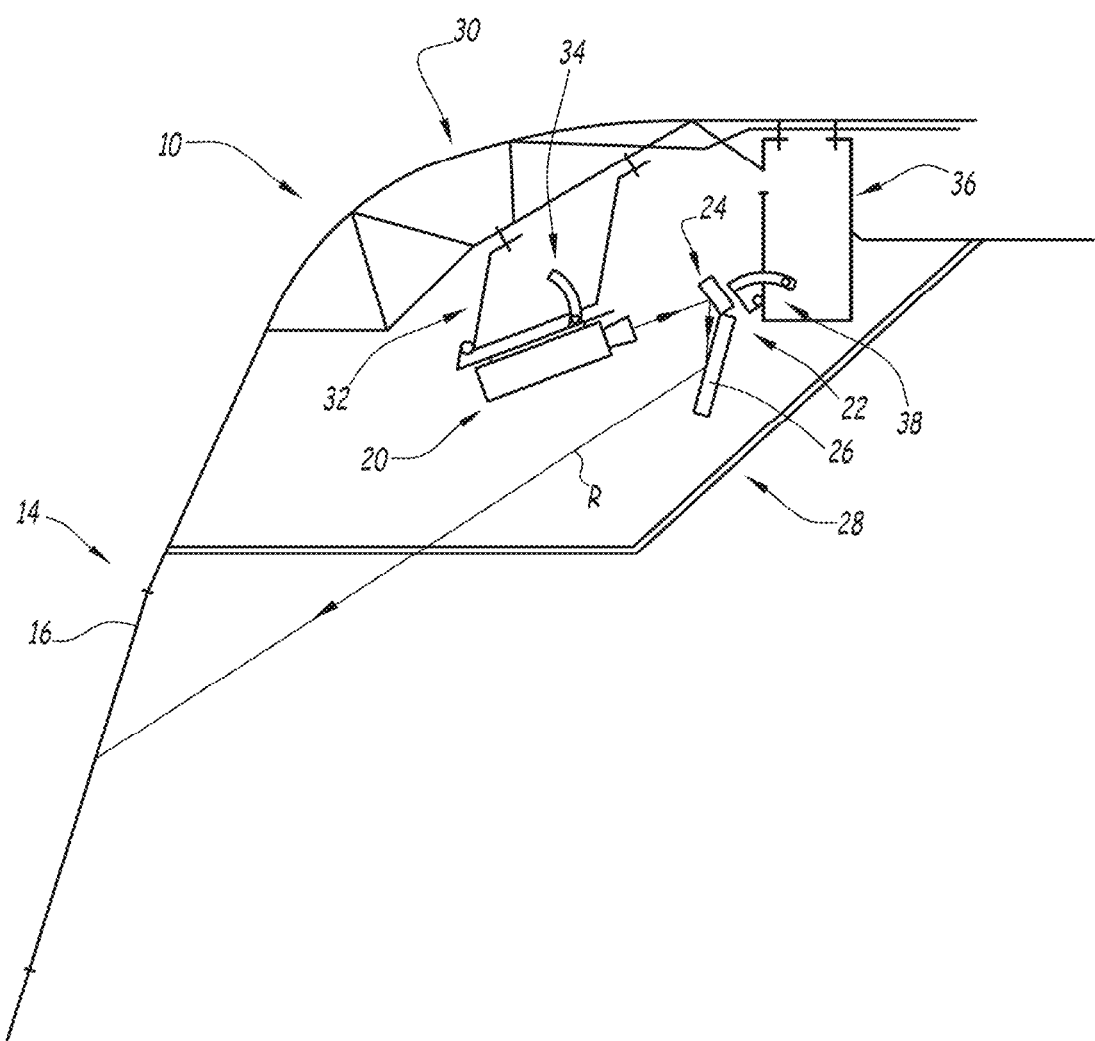

PUBLIC TRANSPORT VEHICLE, INCLUDING A DEVICE FOR DISPLAYING ON A WINDOW

CROSS-REFERENCE TO RELATED APPLICATION

This application claims priority to French Patent Application No. 20 03458 filed on Apr. 7, 2020, the disclosure of which including the specification, the drawings, and the claims is hereby incorporated by reference in its entirety.

FIELD OF THE INVENTION

The present invention concerns a public transport vehicle, particularly a rail vehicle, comprising at least one side bay equipped with a window.

BACKGROUND OF THE INVENTION

In some cases, one wants to display information on the window of a side bay of the vehicle. To that end, a display is provided for displaying images on the window.

Image-displaying devices known from the prior art, however, are not satisfactory.

In particular, certain display devices comprise LCD screens sunk into the window. Such LCD screens do not allow the window to be transparent, and require that the entire window be replaced if it fails.

In order to preserve the window's transparency, there are also display devices comprising an image projector. However, given the architecture of a railway vehicle, it is difficult to arrange such an image projector in such a way as to obtain a satisfactory image on the window. More particularly, either the image is clear but too small, or the image is fuzzy and/or subject to the keystone effect. To achieve an image that is sufficiently clear and large, it would be necessary to arrange the projector a sufficient distance from the window, but this is not possible in a rail vehicle, due to the presence of passengers, the arched shape of the ceiling to which the projector is fastened, and the proximity of the arched panel to the glazings, the target area for implementing projectors.

SUMMARY OF THE INVENTION

It is a particular purpose of the invention to remedy these shortcomings, by proposing a system that makes it possible to display sufficiently large, clean images, despite the constraints tied to the architecture of a rail vehicle.

To that end, a particular object of the invention is a public transport vehicle, particularly a rail vehicle, comprising at least one side bay equipped with a window, and a device for displaying at least one item of information on the window, characterized in that the display device comprises:
- an image projector, fastened to a ceiling of the vehicle, intended to emit light rays;
- a system of at least one mirror arranged to reflect light rays emitted by the image projector, in the direction of the window.

The system of mirrors particularly makes it possible to increase the distance travelled by the light rays, within a smaller storage space for the projector.

Furthermore, the projector is not pointed directly at the window, but to the opposite side, which limits the keystone effect.

A vehicle according to the invention may further comprise one or more of the following characteristics, taken alone or in any combination that is technically possible.

The system of mirrors comprises first and second mirrors, the first mirror being arranged to reflect the light rays emitted by the image projector toward the second mirror, and the second mirror being arranged to reflect the light rays reflected by the first mirror, toward the window.

The second mirror is a pixelized mirror.

At least one of the mirrors is linked to a mount by movable linking means that enable an adjustment of the position of the mirror by translation and/or by tilting.

The image projector is at least partially housed in a housing bounded by the ceiling, typically an arched panel.

The bay comprises a film, particularly a holographic film, covering the window or integrated into the window, the film forming a projection surface for the image.

The vehicle comprises a plurality of bays, each one equipped with a respective display device.

BRIEF DESCRIPTION OF THE DRAWING

The invention will be better understood upon reading the following description, which is given only as an example and with reference to [FIG. 1] the sole FIGURE attached, schematically depicting a rail vehicle according to one example embodiment of the invention.

DETAILED DESCRIPTION OF THE PREFERRED EMBODIMENTS

The FIGURE partially and schematically depicts a public transport vehicle 10, particularly a rail vehicle.

The vehicle 10 comprises a structural body 30 comprising side walls and a ceiling, as well as an arched panel 28.

At least one of the side walls, preferably each side wall, is equipped with at least one bay 14 comprising a window 16.

The vehicle 10 comprises, for at least one of its bays, and preferably for each bay, a respective device for displaying images on the window 16.

The display device comprises an image projector 20 capable of emitting light rays in order to form an image on a projection surface. The image projector 20 is preferably a video projector.

The image may be of any foreseeable type, and for instance may comprise informative text.

The projector 20 is at least partly housed in a housing built into the arched panel 28. The image projector 20 is fastened to the structural body 30 by means of a first mount 32, and first movable fastening means 34 connecting the image projector 20 to the first mount 32. The image projector 20 can be tilted using the first movable fastening means 34.

The projector 20 is oriented to emit light rays opposite the window 16. As an example, a light ray R has been depicted in the FIGURE.

The display device further comprises a system 22 of at least one mirror arranged to reflect light rays R emitted by the image projector 20, in the direction of the window 16.

Advantageously, the system 22 comprises two mirrors, namely a first mirror 24 and a second mirror 26.

The first mirror 24 is arranged to reflect the light rays R emitted by the image projector 20, onto the second mirror 26. The second mirror 26 is arranged to reflect the light rays R reflected by the first mirror 24, onto the window 16.

At least one of the mirrors 24, 26 is linked to a second mount 36 fastened to the structural body 30, particularly to the ceiling, by second movable fastening means 38 that enable an adjustment of the position of the mirror by translation and/or by tilting.

It is therefore possible to adjust the alignment of the mirrors to obtain a satisfactory image on the projection surface.

Advantageously, the second mirror 26 is a pixelized mirror. Such a pixelized mirror makes it possible to enlarge the image and correct the keystone effect caused by the orientation of the projector 20.

Optionally, the keystone effect is also corrected by means of suitable software, within the projector 20.

Advantageously, the first 24 and second 26 mirrors are connected to one another, such as by means of a hinge enabling the mirrors 24, 26 to be tilted relative to one another.

Preferably, the bay 14 comprises a film covering the window 16 or integrated (laminated) into the window 16, the film forming the projection surface for the image. This film is typically a holographic film.

The film enables a better reflection of the image than the window itself, while remaining transparent or substantially transparent. The film therefore forms an effective contact surface.

It will therefore be noted that the mirrors ensure maximum reflection of the luminous flux emitted by the projector 20. There is therefore no loss of luminosity between the projector 20 and the window 16.

It should be noted that the invention is not limited to the previously described embodiment, but may exhibit various additional variants.

What is claimed is:

1. A public transport vehicle comprising at least one side bay equipped with a window, and a display device for displaying at least one item of information on the window, wherein the display device comprises:
    an image projector, intended to emit light rays,
    a system of at least one mirror arranged to reflect light rays emitted by the image projector, in the direction of the window,
wherein the system of at least one mirror comprises first and second mirrors, the first mirror being arranged to reflect the light rays emitted by the image projector toward the second mirror, and the second mirror being arranged to reflect the light rays reflected by the first mirror, toward the window, and wherein the second mirror is a pixelized mirror.

2. A public transport vehicle according to claim 1, wherein the image projector is fastened to a ceiling of the vehicle.

3. A public transport vehicle according to claim 1, wherein at least one of the mirrors is linked to a mount by movable linking means that enable an adjustment of the position of the mirror by translation and/or by tilting.

4. A public transport vehicle according to claim 1, wherein the first and second mirrors are connected to one another by means of a device enabling the mirrors to be tilted relative to one another.

5. A public transport vehicle according to claim 1, wherein the image projector is at least partially housed in a housing bounded by the ceiling.

6. A public transport vehicle according to claim 1, wherein the bay comprises a film covering the window or integrated into the window, the film forming the projection surface for the image.

7. A public transport vehicle according to claim 6, wherein the film is a holographic film.

8. A public transport vehicle according to claim 1, comprising a plurality of bays, each being equipped with a respective display device.

* * * * *